June 2, 1925.
L. J. GRUBMAN
1,540,520
EYE MOUNTING FOR DOLLS
Filed March 26, 1924
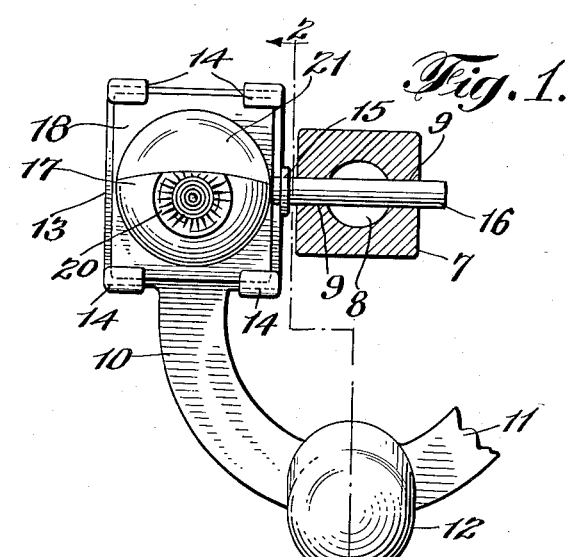
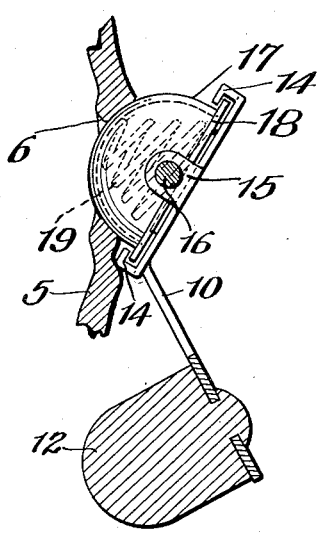
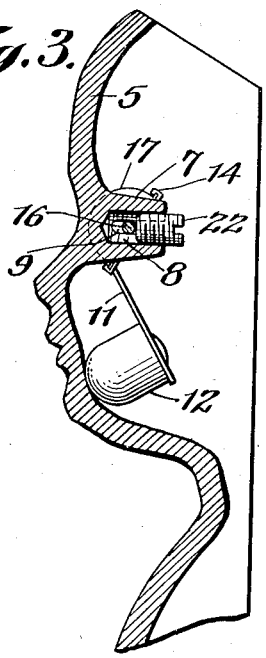
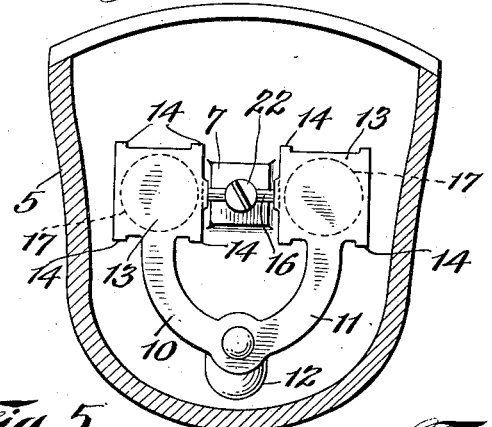
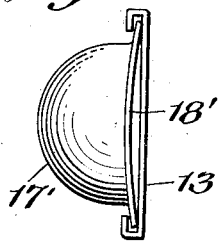
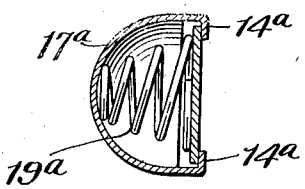
INVENTOR
Leo J. Grubman
BY C. P. Goepel
his ATTORNEY Patented June 2, 1925.

1,540,520

UNITED STATES PATENT OFFICE.

LEO J. GRUBMAN, OF NEW YORK, N. Y., ASSIGNOR TO L. J. GRUBMAN, INCORPORATED, OF LONG ISLAND CITY, NEW YORK, A CORPORATION OF NEW YORK.

EYE MOUNTING FOR DOLLS.

Application filed March 26, 1924. Serial No. 701,896.

*To all whom it may concern:*

Be it known that I, LEO J. GRUBMAN, a citizen of the United States, and a resident of the city, county, and State of New York, have invented certain new and useful Improvements in Eye Mountings for Dolls, of which the following is a specification.

This invention relates to an improved eye mounting for dolls and more particularly, to devices of that character wherein the eyes are mounted or supported within the head structure of a doll for oscillating or turning movement so that the eyes may appear to open and close in the manner of the natural eye to thereby provide what is generally referred to in the art as a "sleeping doll."

It is the particular object and purpose of my present improvements to provide simple and efficient means whereby the individual eyeball members may automatically accommodate themselves to mechanical inaccuracies in the head structure of the doll, such for instance, as misalignment of the geometrical centers of the eye socket openings either horizontally or vertically of the head wall. In other words, I aim to provide a device of this character wherein the individual eye members will always oscillate about the true axial center of the eye socket or opening, although such centers may be out of alignment with each other and likewise out of coinciding relation with the principal axis of oscillation of the eye mounting as a whole.

It is another important object of the invention to provide improved means whereby the eye mounting may be bodily adjusted upon the head wall and the individual eye members yieldingly and independently urged into the eye sockets so that their spherical surfaces are frictionally engaged with the walls of said sockets. Such frictional coaction between the eye members and the socket walls produces a steady uniform rate of movement of the peripheral surface of the eyeball in the swinging movement of the pendulum frame and prevents repeated short oscillatory movements of the frame when the pendulum reaches the limit of its swinging movement in one direction.

It is also a further general object of my invention to provide an eye mounting for dolls which consists of relatively few parts of simple and inexpensive construction, capable of easy and quick assemblage in proper co-operative relation and which will also not require the exercise of a high degree of skill upon the part of the workmen in the proper application of the eye mounting to the doll head.

With the above and other objects in view, the invention consists in the improved eye mounting for dolls and in the form, construction and arrangement of its several parts as will be hereinafter more fully described, illustrated in the accompanying drawing and subsequently incorporated in the subjoined claims.

In the drawings wherein I have illustrated several simple and practical embodiments of my present improvement and in which similar reference characters designate corresponding parts throughout the several views:

Figure 1 is a fragmentary front elevation of the eye mounting, the part of the head structure in which the principal axis of said mounting is supported being shown in section;

Figure 2 is a sectional view taken on the line 2—2 of Figure 1;

Figure 3 is a central vertical section through the front wall of the doll head showing particularly the means for adjusting the eye mounting thereon;

Figure 4 is an interior elevation, the doll head being shown in section;

Figure 5 is a detail elevation showing a slightly modified form of the individual eye members; and Figure 6 is a sectional view illustrating a further modification.

Referring more particularly to Figures 1 to 4 of the drawings, the doll head as represented at 5, is formed or molded from wood pulp, papier mâché or other suitable composition material, though it will be understood that the present invention is equally applicable to doll heads of china, porcelain, metal, wood or other materials heretofore employed in this art.

The front wall of the doll head 5 is provided with the usual spaced eye sockets 6 appropriately located with respect to the nose and other molded features of the head structure. Not infrequently, due to carelessness upon the part of the workmen, shrinkage of the pulp material, or other causes, the centers of these eye sockets are not precisely in line with each other either horizontally or vertically of the head wall. In such instance, it is evident that if the individual eye members rock or oscillate about a common axis mounted upon the head wall, their peripheral surfaces will not move in paths concentric with the walls of the respective sockets. This results in an unnatural appearance and in some cases, may prevent the complete closing of the eyes owing to the binding engagement of the eye members with one side of the eye socket wall. The particular eye mounting which I shall now describe in detail obviates this difficulty and insures a proper accurate movement of the individual eye members with relation to the walls of the eye sockets regardless of misalignment of the socket centers due to the causes above referred to.

As herein shown, in a practical embodiment of the device which I have selected for purposes of illustration, I form on the interior of the front wall of the doll head between the eye sockets, a boss or projection 7. After the material has been moulded, this boss is provided with a threaded bore 8 and at opposite sides of said bore the wall of the boss has slots 9 cut therein.

The individual eye members to be later referred to are carried by a suitably formed metal frame 10. As shown, this frame may consist of integrally connected spaced arms 11, a pendulum weight 12 being suitably affixed to the integrally connected ends of said arms. The other ends of said arms which are spaced apart for a distance approximately corresponding to the distance between the centers of the eye sockets 6, each terminates in a rectangular plate 13. As shown in Figure 1 of the drawings, each of these plates at its corners is provided with angular tongues 14, the free ends of which project inwardly in parallel relation to one side of the plate. The purpose of these tongues will be presently disclosed.

The plates 13 at their inner opposed edges are further provided with angularly projecting ears or lugs 15. The opposite ends of the rod or axis 16 are suitably fixed in these lugs 15 and the said rod or axis is adapted to be engaged in the slots 9 of the tubular boss 7 on the head wall, as seen in Figures 1 and 3 of the drawings.

Each of the eye members 17 is of substantially hemi-spherical hollow form, said members being conveniently moulded from celluloid or other suitable material. The wall of each eye member at its open side is angularly extended to provide a rectangular flange 18 thereon the dimensions of which are somewhat less than the dimensions of the frame plates 13. Therefore, it will be seen that when these flanges 18 are engaged beneath the ends of the tongues 14 on the respective frame plates, there is an appreciable clearance space between the edges of the flange 18 and the tongues 14 so that said eye members may move or shift vertically as well as horizontally in the plane of said flange with respect to the frame plate. It will also be noted from reference to Figure 2 of the drawing that the distance between the plate 13 and the free ends of the tongues 14, is appreciably greater than the thickness of the flange 18 so that the eye members may also move bodily with respect to the frame in a direction at right angles to the plane of the plates 13.

In the embodiment of the invention shown in Figure 2 of the drawings, a conical coil spring 19 is enclosed within the hollow eye member 17, the larger base coil of this spring bearing against the plate 13 while the smaller coil at the opposite end thereof bears against the wall of the eye member 17 at the approximate center thereof. It will be understood of course that the iris and eyelid as represented at 20 and 21 respectively, are realistically painted or otherwise delineated upon the spherical surface of each eye member.

After the eye members have been assembled upon the pendulum frame and the rod or axis 16 engaged in the slots 9 of the boss 7, as above explained, the screw 22 is threaded into the outer end of the bore 8 in said boss. This screw engaging the rod or axis 16 moves the same into the inner ends of the slots 9 until the spherical surfaces of the eye members 17 project through the respective eye sockets or openings and contact with the circumferential walls thereof. By continuing the adjustment of the screw 22, the springs 19 may be compressed to any desired extent to regulate the frictional pressure of the surface of the eye member against the wall of the eye socket, and thus determine the rapidity of oscillation of the eye members in the sockets under the swinging movement of the pendulum weight 12. It will be at once manifest that since the eye members 17 have no fixed connection with the pendulum frame upon which they are carried and supported, they may automatically find their true centers of oscillation as they are brought into bearing contact with the circumferential walls of the eye sockets. Therefore, although the centers of the eye sockets or openings may be out of alignment both horizontally and vertically with respect to the head wall, the eye members will accommodate themselves to such misalignment of the eye socket centers and will shift independently of each other upon the oscillating frame until the spherical surface of each eye member is in exact concentric relation with the wall of the eye socket.

Further, it is to be observed that by the provision of the individually acting springs 19 yieldingly urging the eye members into frictional contact against the walls of the eye sockets and maintaining such contacting relation in all positions of the oscillating frame, it will never occur that the spherical surface of the eye member will become spaced from the circumferential wall of the eye socket, which is a not uncommon occurrence in the operation of such devices heretofore known in the art and which to a greater or less extent destroys the naturalness of the eye movement.

In Figure 5 of the drawings I have shown a possible alternative for the construction and mounting of the eye members as above described wherein the flange 18' of each eye member 17' may be slightly curved or bowed into concavo-convex form. The upper and lower edges of said flange are engaged under the tongues 14 in the same manner as in Figure 2 of the drawings, and when the mounting is applied and adjusted by means of the screw 22 to cause the spherical surfaces of the eye members to bear against the walls of the eye sockets, the flange 18' will be placed under tension, the edges thereof riding upon the surface of the frame plate 13. The tendency of this flange to again assume its normal bowed or curved condition maintains the desired degree of frictional pressure of the surface of the eye member 17' against the wall of the eye socket.

In Figure 6, I have illustrated another alternative construction wherein instead of providing the frame plates 13 with the lugs 14, the wall of the eye member 17$^a$ at the upper and lower sides thereof may be formed with the annular extensions 14$^a$ projecting beyond the open side of the eye member and having their ends turned inwardly to engage over the rear face of the frame plate. In this case, a coil spring 19$^a$ is arranged between the front side of the frame plate and the central part of the eye member, as in the construction shown in Figure 2.

From the foregoing description considered in connection with the accompanying drawing, the construction, manner of operation and several advantages of my present improvements will be clearly understood. It will be seen that the several parts of the new eye mounting may be inexpensively produced and rapidly assembled for application to the doll head without requiring any particular high degree of skill upon the part of the workmen. Also, by reason of the fact that the individual eye members automatically find their proper centers of oscillation relative to the respective eye sockets, it becomes possible to produce a commercially acceptable doll of this character even though the eye socket centers are not accurately aligned. Also, if the mounting should require any further adjustment to compensate for loss of tension of the springs urging the individual eye members into engagement with the eye socket wall, such further adjustment may be easily and quickly made by opening the doll head and merely turning the screw 22 to move the rod 16 and the eye supporting frame relative to the boss 7 and towards the front wall of the doll head.

In the accompanying drawing, I have illustrated several simple and practical ways in which the eye members may be mounted upon the oscillating supporting frame, but no unnecessary limitations are to be implied therefrom since the essential feature of my present improvements is to be broadly comprehended as inclusive of any other alternative means whereby the individual eye members may be oscillatably supported upon the wall of the doll head in such manner that in the operation of mounting the device in position, said eye members will automatically find their true centers of oscillation in concentric relation with the wall of the eye opening or socket and independently of the principal axis of oscillation of the eye mounting as a whole. With this understanding, it will accordingly be manifest that my present disclosures might be exemplified in numerous other structural forms and I, therefore, reserve the privilege of making all such legitimate changes in the form, construction and relative arrangement of the several parts as may be fairly embodied within the spirit and scope of the invention as claimed.

I claim:

1. In combination with a doll head having eye receiving sockets, a support adapted to be oscillatably mounted upon the wall of the doll head and having spaced parts opposed to said sockets, an eye member mounted upon each of said spaced parts for bodily shifting movement in a plane parallel thereto whereby said eye members when the support is mounted upon said wall will automatically and independently find centers of oscillation in concentric relation with the circumferential walls of the respective eye sockets.

2. In combination with a doll head having eye receiving sockets, a support and means for oscillatably mounting said support upon the wall of the doll head, said support having spaced parts opposed to the respective sockets, an eye member mounted upon each of said spaced parts for movement with respect to said parts in directions at right angles to each other, and means yieldingly sustaining the eye members for movement independently of the support whereby when said support is mounted on the doll head said eye members may independently find centers of oscillation concentric to the circumferential walls of the eye sockets.

3. In combination with a doll head having eye receiving sockets, a support and means for oscillatably mounting said support upon the wall of the doll head, said support including spaced parts opposed to the respective sockets, an eye member mounted upon each of said spaced parts, said parts and the respective eye members having coacting means permitting of limited independent shifting movement of said eye members with respect to the support whereby said eye members will automatically assume positions in concentric relation with the walls of the eye sockets for oscillating movement about independent axes, and a spring associated with each of said eye members to yieldingly urge the same into frictional contact with the wall of the eye socket.

4. In combination with a doll head having eye receiving sockets, a support and means for oscillatably mounting said support upon the wall of the doll head, said support having spaced parts opposed to the respective sockets, eye members, and means for mounting said eye members upon the spaced parts of the support for independent shifting movement in two directions with respect to the support whereby, when the support is mounted upon the doll head, said eye members may enter the respective sockets and find centers of oscillation concentric to the circumferential walls of the respective eye sockets and independent of the axis of oscillation of the support.

5. In combination with a doll head having eye receiving sockets and a boss located upon the wall of the doll head between said sockets, a support having an axis oscillatable in said boss and said support having spaced parts opposed to the respective sockets, an eye member movably mounted upon each of said spaced parts and yieldingly shiftable with respect thereto upon engagement of the eye member with the circumferential wall of the eye receiving socket, and means for adjusting said axis relative to said boss to regulate the frictional pressure of the eye members against the socket walls.

6. In combination with a doll head having eye receiving sockets and a boss located upon the head wall between said sockets, a support having an axis mounted in said boss and said support including spaced parts opposed to the respective eye sockets, a hemispherical eye member mounted upon each of said parts, said part being provided with means coacting with said eye member to limit the shifting movement of the eye member relative to said part, a spring interposed between said part and the eye member to yieldingly urge the eye member into frictional contact with the circumferential wall of the eye receiving socket, and means adjustably engaged with the boss and coacting with said axis to shift the support and regulate the frictional pressure of said eye members upon the walls of the eye sockets.

7. In combination with a doll head having eye receiving sockets and a boss projecting from the head wall between said sockets, said boss being provided with a threaded bore and slots at opposite sides thereof, a support having spaced parts and an axis connecting said spaced parts adapted to be engaged in said slots and an adjustable screw threaded in said bore to coact with the axis and adjustably position the support relative to the eye sockets, and an eye member mounted upon each of said spaced parts for shifting movement with respect thereto and frictionally engaging the circumferential wall of the respective eye sockets.

8. In combination with a doll head having eye receiving sockets and a boss located upon the head wall between said sockets in alignment with the axes thereof, a support having an axis mounted in said boss and said support including spaced parts opposed to the respective eye sockets, a hemispherical eye member mounted upon each of said parts, springs interposed between said parts and the eye members to urge the latter into the respective sockets, and means adjustably engaged with said boss and coacting with said axis to shift the support and regulate the frictional pressure of said eye members upon the walls of the eye sockets.

9. In an eye mounting for dolls, eye members comprising hemispherical hollow shells formed with outwardly extending flanges, a pivoted support carrying said eye members and having means cooperating with the flanges thereof for the purpose of transmitting oscillatory movement to the eye members and said means loosely confining said flanges upon the support to permit of limited shifting movement of the eye members relative to the support.

10. In an eye mounting for dolls, eye members comprising hemispherical hollow shells formed with outwardly extending flanges, a support carrying said eye members and provided with portions overlapping upon the flanges thereof to retain the eye members in assembled relation upon the support.

11. In an eye mounting for dolls, a support adapted to be oscillatably mounted upon the wall of the doll head and having spaced plane surfaces, hemispherical eye members each having an outwardly extending flange for bearing engagement upon one of said plane surfaces of the support, and said support provided with means for retaining the flanges of the eye members upon said surfaces whereby the oscillatory movements of the support are transmitted to said eye members.

12. In combination with a doll head having eye receiving sockets and a boss located upon the wall of the doll head between said sockets in alignment with the axes thereof, a support having an axis mounted in said boss and said support inicluding spaced parts opposed to the respective eye sockets, eye members mounted upon said parts, and means adjustably engaged with the boss and coacting with said axis of the support to shift the latter and adjust the relationship between said eye members and the walls of the eye sockets.

13. In an eye mounting for dolls, a support adapted to be oscillatably mounted upon the wall of a doll head and having spaced parts, eye members carried by said spaced parts of the support, resilient means between said spaced parts and the eye members adapted to urge the latter into frictional contact with the circumferential walls of the eye sockets in the doll head, and said resilient means permitting of the oscillating movement of the eye members in concentric relation to the eye sockets independently of the axis of oscillation of the support.

14. In combination with a doll head having eye receiving sockets, a support adapted to be oscillatably mounted upon the wall of a doll head and having spaced parts opposed to said sockets, an eye member mounted upon each of said spaced parts of the support for bodily shifting movement in a plane parallel thereto whereby said eye members, when the support is mounted upon the wall of the doll head, will automatcially and independently find centers of oscillation in concentric relation with the respective eye sockets, and means yieldingly urging the eye members into frictional operative contact with the walls of the respective eye sockets.

In testimony that I claim the foregoing as my invention, I have signed my name hereto.

LEO J. GRUBMAN.